US006839625B2

(12) United States Patent
Kunzeman et al.

(10) Patent No.: US 6,839,625 B2
(45) Date of Patent: Jan. 4, 2005

(54) APPARATUS AND METHOD FOR REDUCING WORK MACHINE NOISE BASED ON LOCATION

(75) Inventors: Joseph D. Kunzeman, Decatur, IL (US); Thomas L. Derry, Edwards, IL (US)

(73) Assignee: Caterpillar Inc, Peoria, IL (US)

( * ) Notice: Subject to any disclaimer, the term of this patent is extended or adjusted under 35 U.S.C. 154(b) by 925 days.

(21) Appl. No.: 09/800,284

(22) Filed: Nov. 29, 2000

(65) Prior Publication Data

US 2002/0065607 A1 May 30, 2002

(51) Int. Cl.[7] .......................... G01C 21/00; G06G 7/78; G06F 19/00

(52) U.S. Cl. ....................... 701/207; 701/208; 701/213; 701/50

(58) Field of Search .......................... 701/207, 208.213, 701/50

(56) References Cited

U.S. PATENT DOCUMENTS 5,170,433 A * 12/1992 Elliott et al. ................ 704/226
5,722,502 A * 3/1998 Kubo ........................ 180/65.4
5,802,184 A * 9/1998 Heath ........................ 381/71.4
6,113,193 A 9/2000 Kunzeman
2002/0072963 A1 * 6/2002 Jonge .......................... 705/13
2002/0117857 A1 * 8/2002 Eckstein ........................ 290/2
2003/0003965 A1 * 1/2003 Gough ....................... 455/567
2003/0229434 A1 * 12/2003 Miedema ..................... 701/50

* cited by examiner

*Primary Examiner*—Thomas G. Black
*Assistant Examiner*—Brian J Broadhead
(74) *Attorney, Agent, or Firm*—Thomas L Derry

(57) ABSTRACT

An apparatus for reducing noise from a work machine is disclosed. The work machine includes a location determining device for determining the location of the work machine within a work site and a memory device for storing desired noise levels for each location within the work site. The work machine further includes a control unit for determining the location of the work machine from the location determining device and reading the desired noise level for the location from the memory device. The control unit further places the work machine in a normal mode of operation if the desired noise level exceeds a threshold noise level and places the work machine in a reduced noise mode of operation if the desired noise level falls below the threshold noise level. A method for reducing noise from a work machine is also disclosed.

16 Claims, 2 Drawing Sheets

FIG - 1 -

APPARATUS AND METHOD FOR REDUCING WORK MACHINE NOISE BASED ON LOCATION

TECHNICAL FIELD

The present invention relates generally to a noise reduction apparatus and method and, more particularly, to an apparatus and method for reducing work machine noise based on location.

BACKGROUND

A work machine, such as an off-highway truck, is designed perform various work operations at different locations within a work site. One such operation is the movement of material from a pit location to a processing location. As the work machine moves between various locations in a work site, the noise generated by the work machine may travel different distances depending on the surrounding geography. For example, while operating within the pit location, sound from the work machine is generally directed upwardly and away from a noise sensitive population center. On the other hand, in other locations in the work site, sound waves may propagate directly toward the population center. Thus, there is a need to operate the work machine in a reduced noise mode of operation in some locations, while also operating the work machine in a normal mode of operation in other locations, such as the pit location.

In addition, sound propagates through the atmosphere different distances depending on the time of day. Generally, during the day there is a higher level of background noise caused by various human activities, whereas during the night there is a lower level of background noise and any sound generated at night tends to be audible over a greater distance. A drawback to the different levels of background noise is that the locations where a normal mode of operation may be acceptable during the day may not be acceptable at night.

The present invention is directed to overcoming one or more of the above-mentioned drawbacks.

SUMMARY OF THE INVENTION

In accordance with one aspect of the present invention, there is provided an apparatus for reducing noise from a work machine. The work machine includes a location determining device for determining the location of the work machine within a work site and a memory device for storing desired noise levels for each location within the work site. The work machine further includes a control unit for determining the location of the work machine from the location determining device and reading the desired noise level for the location from the memory device. The control unit further places the work machine in a normal mode of operation if the desired noise level exceeds a threshold noise level and places the work machine in a reduced noise mode of operation if the desired noise level falls below the threshold noise level.

In accordance with a second aspect of the present invention, there is provided a method for automatically reducing noise from a work machine. The work machine has a location determining device for determining the location of the work machine within a work site and a memory device for storing desired noise levels for each location within the work site, and a control unit. The method includes the step of determining the location of the work machine from the location determining device. The method further includes the step of reading the desired noise level for the location from the memory device. The method yet further includes the step of placing the work machine in a normal mode of operation if the desired noise level exceeds a threshold noise level and placing the work machine in a reduced noise mode of operation if the desired noise level falls below the threshold noise level.

DETAILED DESCRIPTION

Figure 1:
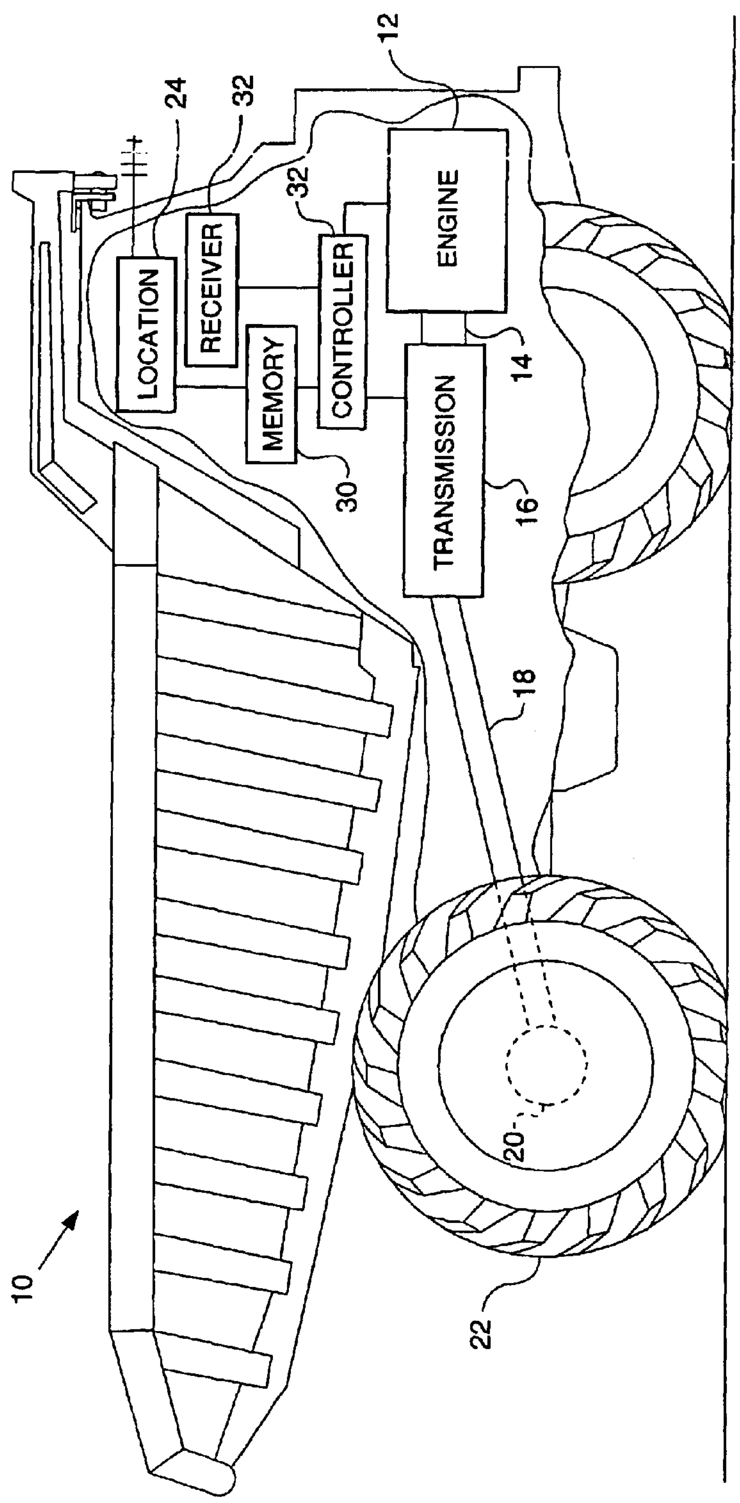
FIG. 1 is a partial cutaway side view of a work machine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a work machine 10, such as an off-highway truck typically used in mining applications. The work machine 10 could alternately be a track-type tractor, loader, front shovel, excavator or some other type of earthmoving equipment. However, the present invention is most beneficial to off-highway trucks because off-highway trucks tend to operate over a wider area than other types of earthmoving equipment. The work machine 10 includes an engine 12 which drives a transmission input shaft 14 which in turn drives the transmission 16. The transmission 16 is operable to select a number of different gear ratios between the transmission input shaft 14 and a transmission output shaft 18. The transmission output shaft 18 further drives a final drive 20 which in turn drives a drive wheel 22 which propels the work machine 10 about a work site 50 shown in FIG. 2.

Figure 2:
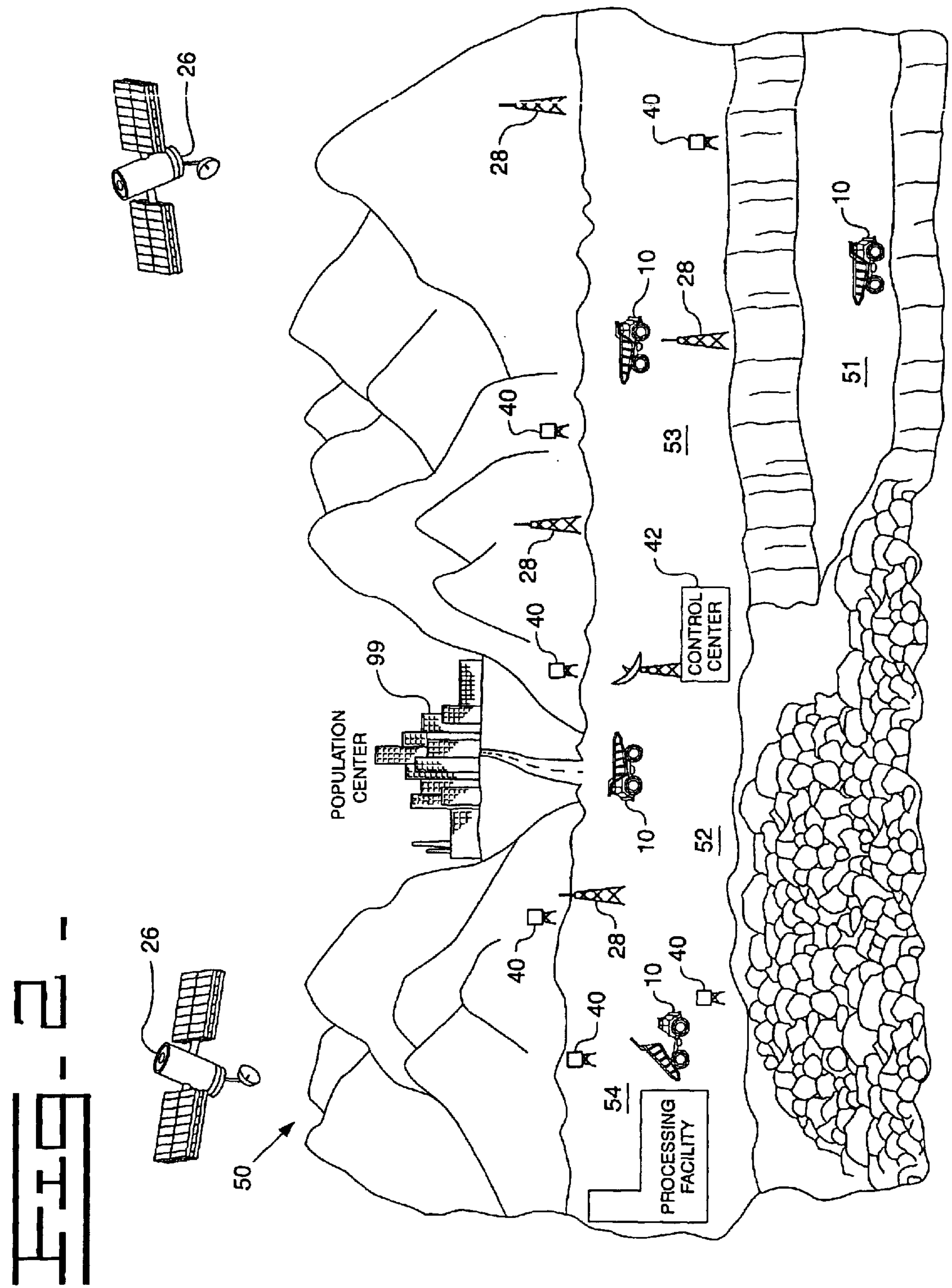
FIG. 2 is a schematic view of a work site showing several of the work machines of FIG. 1.

Referring now to FIGS. 1 and 2, the work machine 10 further includes a location determining device 24 which can determine the location of the work machine 10 within the work site 50. In one embodiment of the present invention, the location determining device 24 is a global positioning system which can be used to determine the location of the work machine 10 within the work site 50 by receiving signals from satellites 26 in orbit above the work site 50.

Alternately, the location determining device 24 could receive position signals from local transponders 28 (shown in FIG. 2) which transmit a location signal which can be used to determine the location of the work machine 10 within the work site 50. Such location signals could typically be radio frequency transmission, but also could be laser signals generated at each of the local transponders 28. As a further alternative, the location determining device 24 could be an inertial system which can determine the location of the work machine 10 by entering a known starting location and using changes in inertia to determine the current location of the work machine 10 within the work site 50 relative to the known starting position.

The work machine 10 further includes a memory device 30. The memory device 30 is operable to receive the location of the work machine 10 from the location determining device 24 and store the location of the work machine 10 within the work site 50. In addition, the memory device 30 is operable to store a predetermined desired noise level for the each location within the work site 50. The memory device 30 is also operative to store a number of engine high idle speeds which control the speed of the engine 12 as well as a number of shift points which control the engine speed at which a shift is made from one gear ratio to another.

The memory device 30 is further operable to store time information which is used to vary the desired noise level for each location. It should be appreciated the desired noise level can vary due to the time of day in which the work machine 10 is operating. For example, during the day there is more background noise generated by human activity which can conceal the generation of a considerable amount of noise generated at the work site 50. Thus, during the day, the desired noise level for each location is set to a relatively high level. On the other hand, during the night, there is considerably less noise generated by human activity. Thus, during the night, the desired noise level for each location can be set to a relatively low level.

The work machine 10 yet further includes a control unit or controller 32 operable to control the operation of the engine 12 and the transmission 16. The controller 32 can place the work machine 10 in either a normal mode of operation whereby the noise generated by the work machine 10 is not reduced or a reduced noise mode of operation whereby the noise generated by the work machine 10 is reduced.

To place the work machine 10 in the normal mode of operation by controlling the engine 12, the controller 32 reads a first speed from the memory 30 and sets the high idle setting of the engine 12 to the first speed. Alternately, to place the work machine 10 in the reduced mode of operation by controlling the engine 12, the controller 32 reads a second engine speed from the memory device 30 and sets the high idle setting of the engine 12 to the second speed. It should be appreciated that to reduce the noise generated by the work machine 10 the second speed should be lower than the first speed.

To place the work machine 10 in the normal mode of operation by controlling the transmission 16, the controller 32 reads a first shift point from the memory 30 which controls the engine speed at which the transmission 16 shifts between a first gear ratio and a second gear ratio. Alternately, to place the work machine 10 in the reduced mode of operation by controlling the transmission 16, the controller 32 reads a second shift point from the memory device 30 which controls the engine speed at which the transmission 16 shifts between the first gear ratio and the second gear ratio. It should be appreciated that to reduce the noise generated by the work machine 10 the second shift point occurs at a lower engine speed than the first shift point.

In addition, sound level meters 40 may be positioned at various locations around the work site 50. The sound level meters 40 measure the ambient noise at each location within the work site 50 and transmit sound level information to a control center 42. Alternately, the sound level information for the entire work site 50 could be transmitted to each of the work machines 10, thus, eliminating the need for the control center 42. The sound level information is then used to determine the desired noise level for each location within the work site 50 which is then stored in the memory device 30.

The work machine 10 further includes a receiver 32 which can receive several types of information from the work site 50. In particular, the receiver 32 is operable to receive sound level information for each location within the work site 50 from either the control center 42 or directly from the sound level meters 40. This sound level information is used to determine the desired noise level which is then compared to the threshold noise level for each location to determine which mode of operation the work machine 10 should be placed in. If the desired noise level exceeds the threshold noise level for a given location, then the work machine 10 is placed in the reduced mode of operation when operation in near that location. On the other hand, if the desired noise level is below the threshold noise level for a given location, then the work machine 10 is placed in the normal mode of operation when the work machine 10 is operating near that location.

INDUSTRIAL APPLICABILITY

In operation, the work machine 10 uses a location determining device 24 to determine the location of the work machine 10 within a work site 50. The location of the work machine 10 may be determined from global positing satellites 26, location transmitters 28, or some alternate means. The location of the work machine 10 is then stored in a memory device 30.

A controller 32 reads the desired noise level for the location from the memory device 32 and either places the work machine 10 in a normal mode of operation if the desired noise level exceeds a threshold noise level or places the work machine 10 in a reduced noise mode of operation if the desired noise level falls below the threshold noise level. Sound level meters 40 may be used to determine the desired noise levels for each location within the work site 50. In addition, the desired noise level may also be varied as a function of the time of day to account for changes in background noise.

The normal mode of operation can be accomplished by limiting the speed of the engine to a first speed whereas the reduced mode of operation can be accomplished by limiting the speed of the engine to a second speed which is less than the first speed. Alternately, the normal mode of operation can be accomplished by shifting the transmission 16 from one gear ratio to the next at a first shift point whereas the reduced mode of operation can be accomplished by shifting the transmission at a second shift point which occurs at a lower engine speed than the first shift point.

For example, when operating in the pit location 51, most of the sound generated by the work machine 10 is directed upwardly away from a noise sensitive population center 99. Even during the night, the noise of the work machine 10 is not directed toward the population center 99. Thus, when operating in the pit location 51, the work machine 10 should clearly be placed in the normal mode of operation.

On the other hand, when operating near the cut location 52 most of the sound generated by the work machine 10 is directed toward the noise sensitive population center 99. Even during the day, the noise of the work machine 10 adversely effects the noise levels within the population center 99. Thus, when operating near the cut location 52, the work machine 10 should clearly be placed in the reduced noise mode of operation.

However, when operating near the transit location 53 or the processing location 54 it is unclear of whether the sound generated by the work machine 10 reaches the noise sensitive population center 99. When operating in the transit location 53 or the processing location 54, sound level information from the sound level meters 40 is used to determine the desired noise level for each location 53, 54. If the desired noise level exceeds the threshold noise level, the work machine 10 is placed in the reduced noise mode of operation whereas if the desired noise level does not exceed the threshold noise level, the work machine 10 is placed in the normal mode of operation. It should be appreciated that the threshold noise level is adjusted downwardly during the night such that the mode of operation of the work machine 10 in the locations 53, 54 may change based on sound level information and time of day.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

Other aspects, objects and advantages of the present invention can be obtained from a study of the drawings, the disclosure and the appended claims.

What is claimed is:

1. An apparatus for automatically reducing noise from a work machine, comprising:

a location determining device for determining the location of the work machine within a work site;

a memory device for storing desired noise levels for each location within the work site; and a control unit for (i) determining the location of the work machine from the location determining device, (ii) reading the desired noise level for the location from the memory device, (iii) placing the work machine in a normal mode of operation if the desired noise level exceeds a threshold noise level, and (iv) placing the work machine in a reduced noise mode of operation if the desired noise level falls below the threshold noise level.

2. The apparatus of claim 1, wherein the location determining device is a global positioning system.

3. The apparatus of claim 1, further comprising an engine which powers the work machine, wherein:

the engine is limited to a first speed in the normal mode of operation, the engine is limited to a second speed in the reduced noise mode of operation, and the second speed is less than the first speed.

4. The apparatus of claim 1, further comprising:

an engine driving a transmission input shaft; and a transmission which selects a gear ratio, or ratio of the speed of an output shaft of the transmission to the speed of the input shaft of the transmission, wherein:

a first shift point between a first gear ratio and a second gear ratio is determined for the normal mode of operation, a second shift point between a first gear ratio and a second gear ratio is determined for the reduced noise mode of operation, and the second shift point occurs at a lower engine speed than the first shift point.

5. The apparatus of claim 1, wherein the desired noise level for each location within the work site varies with the time of day.

6. The apparatus of claim 5, wherein the desired noise level at night is less than the desired noise level during the day.

7. The apparatus of claim 1, wherein sound level meters are used to determine the desired sound level for each location.

8. The apparatus of claim 1, further comprising a central control center which transmits the desired noise level for each location to the memory device.

9. A method for automatically reducing noise from a work machine having a location determining device for determining the location of the work machine within a work site, a memory device for storing desired noise levels for each location within the work site, and a control unit, comprising the steps of:

determining the location of the work machine from the location determining device;

reading the desired noise level for the location from the memory device;

placing the work machine in a normal mode of operation if the desired noise level exceeds a threshold noise level; and placing the work machine in a reduced noise mode of operation if the desired noise level falls below the threshold noise level.

10. The method of claim 9, further comprising the step of providing a global positioning system as the location determining device.

11. The method of claim 9, the work machine further having an engine which provides power, further comprising the steps of:

limiting the engine to a first speed in the normal mode of operation; and limiting the engine to a second speed in the reduced noise mode of operation where the second speed is less than the first speed.

12. The method of claim 9, the work machine further having an engine driving an input shaft to a transmission which selects a number of gear ratios between the input shaft and an output shaft of the transmission, further comprising the steps of:

determining a first shift point between a first gear range and a second gear range for the normal mode of operation; and determining a second shift point between a first gear range and a second gear range for the reduced noise mode of operation where the second shift point occurs at a lower engine speed than the first shift point.

13. The method of claim 9, further comprising the step of varying the desired noise levels for each location within the work site with the time of day.

14. The method of claim 13, further comprising the step of reducing the desired noise level at night.

15. The method of claim 9, further comprising the steps of:

providing sound level meters at each location; and determining the desired sound level for each location with the sound level meter.

16. The method of claim 9, further comprising the step of transmitting the desired noise level for each location from a central control center to the memory device.

* * * * *